United States Patent [19]

Shah

[11] 4,259,311

[45] Mar. 31, 1981

[54] DECOMPOSITION OF $AlCl_3 \cdot 6H_2O$ IN $H_2$ ATMOSPHERE

[75] Inventor: Ishwarlal D. Shah, Edina, Minn.

[73] Assignee: The United States of America as represented by the Secretary of the Interior, Washington, D.C.

[21] Appl. No.: 60,102

[22] Filed: Jul. 24, 1979

[51] Int. Cl.³ .............................................. C01F 7/30
[52] U.S. Cl. .................................. 423/625; 423/631; 423/481
[58] Field of Search ............................... 423/625, 631

[56] References Cited

U.S. PATENT DOCUMENTS

| | | | |
|---|---|---|---|
| 2,663,620 | 12/1953 | Haensel | 423/631 |
| 2,667,404 | 1/1954 | Haensel | 423/631 |
| 3,406,010 | 10/1968 | Holdeneed et al. | 423/625 |
| 3,954,945 | 5/1976 | Lange et al. | 423/625 |

*Primary Examiner*—Herbert T. Carter
*Attorney, Agent, or Firm*—William S. Brown; Donald A. Gardiner

[57] ABSTRACT

$AlCl_3 \cdot 6H_2O$ is decomposed at a temperature above about 700° C. in the presence of hydrogen to form an alumina product having a very low residual chlorine content.

3 Claims, No Drawings

DECOMPOSITION OF ALCL$_3$.6H$_2$O IN H$_2$ ATMOSPHERE

Leaching of clays with mineral acid to dissolve aluminum is well known. Aluminum chloride hexahydrate, i.e., AlCl$_3$.6H$_2$O, is conventionally precipitated from the leach liquors, and subsequently roasted to form alumina. In addition, recrystallization of the AlCl$_3$.6H$_2$O, or purification of the leach liquors, is generally employed to remove impurities such as iron. However, the resulting aluminum still commonly has an undesirably high residual chlorine content, particularly where the alumina is to be used in the Hall process whereby aluminum metal is prepared by electrolysis of alumina dissolved in a bath of molten cryolite. For this purpose, the alumina feed should contain no more than about 0.01 percent chlorine. In addition, low chlorine contents are frequently desirable where high quality refractory alumina is required.

It has now been found, according to the process of the invention, that alumina having a very low chlorine content, e.g., less than about 0.01 weight percent, may be prepared by decomposition of AlCl$_3$.6H$_2$O at an elevated temperature of about 700 to 1100° C., and preferably about 800–950° C., in an atmosphere comprising hydrogen.

The decomposition reaction may be carried out in any conventional reactor capable of providing the required temperature and atmosphere, the latter consisting of hydrogen or a mixture of hydrogen with an inert gas or steam. Preferably, the required atmosphere is provided by a flow of hydrogen, or mixture of hydrogen with an inert gas such as nitrogen, through the reactor at a rate sufficient to remove gaseous HCl formed by decomposition of the AlCl$_3$.6H$_2$O, as well as providing the required concentration of hydrogen. The pressure at which the reaction is carried out is not critical, atmospheric pressure usually being satisfactory.

Optimum flow rates of the components of the gaseous atmosphere will depend on the specific reactor employed, amount of AlCl$_3$.6H$_2$O, composition of the gaseous atmoshere, temperature and time of the reaction, desired purity, i.e., freedom from residual chlorine, of the product, etc., and are best determined experimentally. Optimum time of the reaction will also vary with these variables, with reaction times of about 1.5 to 4 hours generally being sufficient to provide a product having a residual chlorine content of the desired 0.01 percent or less.

The process of the invention may also be carried out in two stages, the first stage reaction being carried out at a lower temperature, i.e, about 200° to 600° C. This procedure enables substantial reduction of the amount of corrosive gaseous HCl formed at the higher temperature, i.e., about 700° to 1100° C., of the second stage reaction. The first stage employs an atmosphere of an inert gas such as nitrogen or a mixture of nitrogen with hydrogen or steam. Again, atmospheric pressure is satisfactory. This first stage reaction should accomplish a reduction of the chlorine content of the feed to about 10 percent or less. Reaction time of the first stage reaction will usually range from about 0.5 to 2 hours.

Reaction conditions for the second stage of the two-stage reaction are essentially the same as those discussed above, in which the process of the reaction is carried out in a single stage.

The process of the invention will be more specifically illustrated by the following examples.

EXAMPLE 1

In a series of tests, AlCl$_3$.6H$_2$O was first decomposed at about 300° C. in N$_2$ atmosphere. This first-stage decomposed sample, containing 8.3 percent residual chlorine, was then used for second-stage decomposition. In the second-stage decomposition, 4.5 gram samples were decomposed either in N$_2$ or O$_2$ or H$_2$ flowing at a rate of 600 cc/min at 900° C. in a horizontal tube furnace for 4 hours. The products were analyzed for chlorine and the results are shown in the following table. The beneficial effect of H$_2$ over N$_2$ or O$_2$ in reducing the residual chlorine is evident from these results.

| Gaseous atmosphere | Residual Chlorine, percent |
| --- | --- |
| N$_2$ | 0.021 |
| O$_2$ | 0.024 |
| H$_2$ | 0.008 |

EXAMPLE 2

In a series of tests, AlCl$_3$.6H$_2$O was first decomposed at about 250° C., in N$_2$-stream atmosphere. This first-stage decomposed sample, containing 5.8 percent residual chlorine, was then used for second-stage decomposition. In second-stage decomposition, 4.5 gram samples were decomposed in H$_2$(200 cc/min), and H$_2$(200 cc/min) plus steam (70 cc/min). The beneficial effect of H$_2$ and H$_2$+steam in reducing the residual chlorine is evident from these results.

| Gaseous atmosphere | Residual chlorine, percent |
| --- | --- |
| H$_2$ | 0.007 |
| H$_2$ and steam | <0.003 |

I claim:

1. A process for decomposition of aluminum chloride hexahydrate consisting essentially of initially heating the hexahydrate feed in a reaction vessel at a temperature of about 200° to 600° C. in an atmosphere of nitrogen or a mixture of nitrogen with hydrogen or steam for a period sufficient to reduce the chlorine content of the feed to about 10 percent or less, and subsequently heating the feed of reduced chlorine content at a temperature of about 700° to 1100° C. in an atmosphere consisting essentially of hydrogen or a mixture of hydrogen and an inert gas or steam for a period sufficient to form an alumina product having a residual chlorine content of less than about 0.01 percent.

2. The process of claim 1 in which the subsequent heating of the feed of reduced chlorine content is at a temperature of about 800° to 950° C.

3. The process of claim 1 in which the inert gas is nitrogen.

* * * * *